United States Patent [19]
Yoshida

[11] Patent Number: 5,434,634
[45] Date of Patent: Jul. 18, 1995

[54] CAMERA WITH DATA RECORDING DEVICE AND DATA RECORDING METHOD

[75] Inventor: Yutaka Yoshida, Saitama, Japan

[73] Assignee: Fuji Photo Film Co., Ltd., Kanagawa, Japan

[21] Appl. No.: 159,627

[22] Filed: Dec. 1, 1993

[30] Foreign Application Priority Data

Dec. 2, 1992 [JP] Japan .................. 4-323448

[51] Int. Cl.⁶ ............................................. G03B 17/24
[52] U.S. Cl. ................................................. 354/106
[58] Field of Search .............................. 354/105, 106

[56] References Cited

U.S. PATENT DOCUMENTS

| | | | |
|---|---|---|---|
| 5,155,513 | 10/1992 | Matsumura | 354/106 |
| 5,181,058 | 1/1993 | Egawa | 354/105 |
| 5,204,708 | 4/1993 | Witfield et al. | 354/105 |
| 5,294,949 | 3/1994 | Robinson et al. | 354/106 |

FOREIGN PATENT DOCUMENTS

| | | |
|---|---|---|
| 3278041 | 12/1991 | Japan . |
| 4116539 | 4/1992 | Japan . |
| 4136830 | 5/1992 | Japan . |
| 4298729 | 10/1992 | Japan . |
| 5165090 | 6/1993 | Japan . |
| 5188467 | 7/1993 | Japan . |

*Primary Examiner*—Michael L. Gellner
*Assistant Examiner*—Nicholas J. Tuccillo
*Attorney, Agent, or Firm*—Sughrue, Mion, Zinn, Macpeak & Seas

[57] ABSTRACT

A magnetic recording device of a camera is driven, while a photographic film is advanced by one frame by a motor, to record photographic data on a magnetic recording layer of the film. A current flowing through the motor contains a periodically changing ripple signal. The ripple signal detected by a ripple detector is converted into ripple pulses by a wave-shaping circuit. The ripple pulses are supplied to a prescaler which generates one prescaler pulse each time a predetermined number of ripple pulses are counted. A timing signal is generated at the period obtained by multiplying the prescaler pulse period by a coefficient K. One bit data is read in response to the timing signal and recorded on the photographic film. The coefficient K is calculated each time one frame advance is completed, and is used for the next frame data record. In a preferred embodiment, a rotary member is fixed to the rotary shaft of the motor. A photosensor detects the rotation of the rotary member and generates pulses to be supplied to the prescaler.

28 Claims, 12 Drawing Sheets

ENCODE PULSE

CAMERA WITH DATA RECORDING DEVICE AND DATA RECORDING METHOD

BACKGROUND OF THE INVENTION

1. Field of the Invention

The present invention relates to a camera with a data recording device and a data recording method therefor. More particularly, the invention relates to a camera with a data recording device and a data recording method in which each bit of digital data is recorded on a photographic film while the film is advanced by one frame.

2. Description of the Related Art

A recording device is known which records on a photographic film exposure control information indicating parameters such as a shutter speed, an aperture value, a use/non-use of a flash, and print information such as trimming data. The recorded information is read during a photofinishing process at a laboratory to control the print exposure or execute trimming of a print. In recording such information, a magnetic recording method or an optical recording method is used.

Digital recording is preferable in order to reduce read/write errors as much as possible. For digital recording, digital data constructed of a plurality of bits is used. Each bit is represented by one of magnetized and non-magnetized areas, or one of exposed and unexposed areas.

Digital data is recorded in association with each frame of a photographic film, for example, at the peripheral area or the lateral side of each frame, while the film is advanced by one frame after photographing. It is required to record each bit to have a predetermined data record length. If a film advance speed is always constant, each bit can be written or read correctly by controlling the read/write period of respective bits, basing upon the constant film advance speed. In this case, the record time of each bit to be written by a magnetic head or light emitting diode, can be controlled in accordance with the constant film advance speed, providing a predetermined record length of each bit. However, in practical situation, the load of a single motor used for the film advance, shutter charge, and the like varies during a one frame film advance. As a result, the film advance speed varies in a complicated manner during a one frame advance, and is also varied for each camera. It is therefore difficult to correctly record each bit by using as a reference the time lapse during a one frame film advance.

Figure 15:
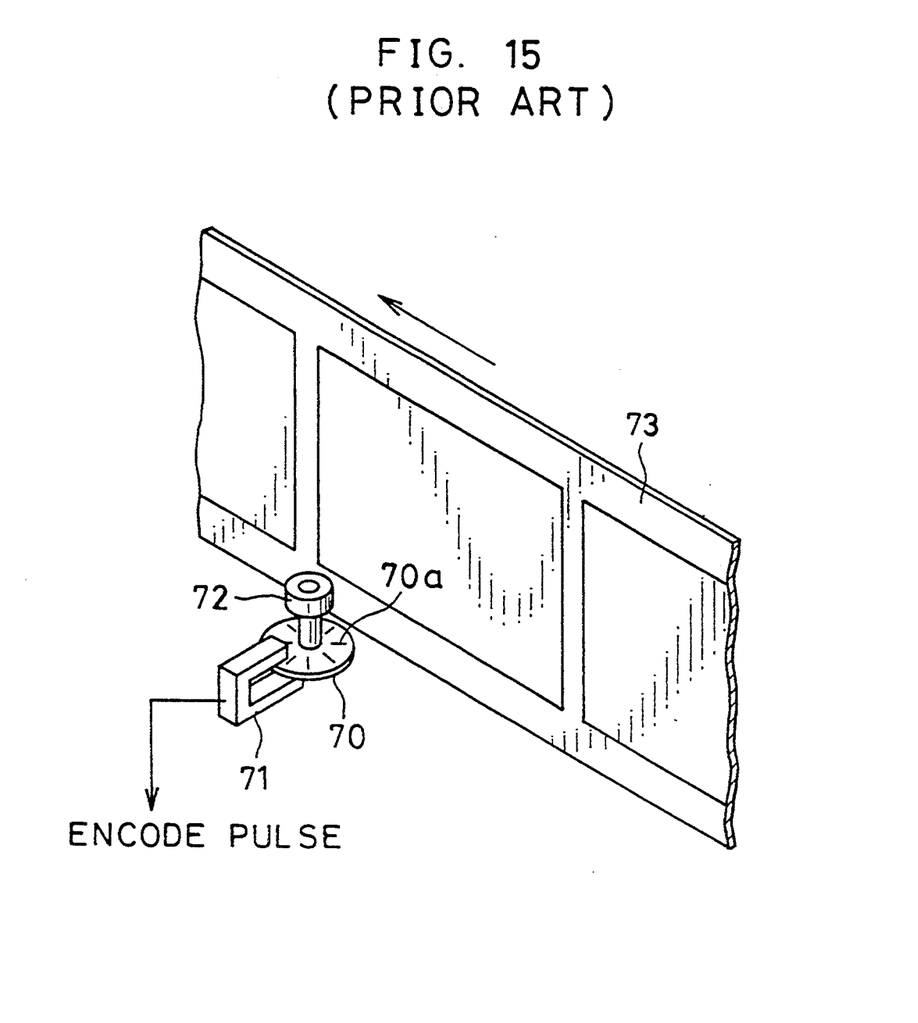
FIG. 15 is a perspective view of a conventional encoder.

To make the record length of each bit uniform, it is necessary to drive a record element such as a magnetic head or a light emitting diode while precisely measuring a film advance speed or length. A conventional data recording device uses a film encoder such as shown in FIG. 15. The film encoder has a roller 72 rotating with the advance of a film 73 and an encoder plate 70 coupled to the roller 72. The encoder plate 70 has a plurality of slits 70a formed at a fine pitch and extending radially. Each slit 70a is photoelectrically detected by a photosensor such as a photo-interrupter. The film advance speed or amount is measured from the number of slits 70a detected during a predetermined time period to control the record time or period.

Use of a film encoder results in an increase of cost. Furthermore, it is necessary to mount it along a film passageway, limiting the mount space and increasing the camera size. It is also difficult to uniformly manage the friction between the roller 72 and film 73. If there is any slip therebetween, the record length of each bit changes. Also, the roller 72 may sometimes scratch the film 73.

SUMMARY OF THE INVENTION

It is a principal object of the present invention to provide a camera with a data recording device and a data recording method, in which a film encoder is not thus reducing the camera size and cost.

It is another object of the present invention to provide a camera with a data recording device and a data recording method therefor, capable of making the record length of each bit constant.

In order to achieve the above and other objects of the present invention, one bit record time or period is determined in accordance with the period of pulses generated each time a motor for advancing a photographic film rotates by a predetermined rotary angle and a coefficient determined for each frame. The coefficient is determined from one bit record length, the total number of pulses generated during one frame advance, and one frame length. The pulse can be generated by detecting a ripple signal contained in the motor current. According to another embodiment of the present invention, the pulse can be generated by monitoring the rotation of a rotary member, such as a vane and a gear, fixed to the shaft of the motor, by using a photosensor.

According to the present invention, one bit record period is determined in accordance with a pulse generated each time the motor rotates by a predetermined rotary angle. An expensive film encoder is therefore unnecessary, reducing the camera size and cost. The coefficient representing the relationship between the film advance amount and the motor rotation amount is calculated each time a preceding frame advance is completed. Accordingly, the record length of each bit can be made constant without being affected by the order of frames.

BRIEF DESCRIPTION OF THE DRAWINGS

The above and other objects and advantages of the present invention will become apparent from the detailed description of the preferred embodiments when read in conjunction with the accompanying drawings, in which.

DETAILED DESCRIPTION OF THE PREFERRED EMBODIMENTS

Figure 1:
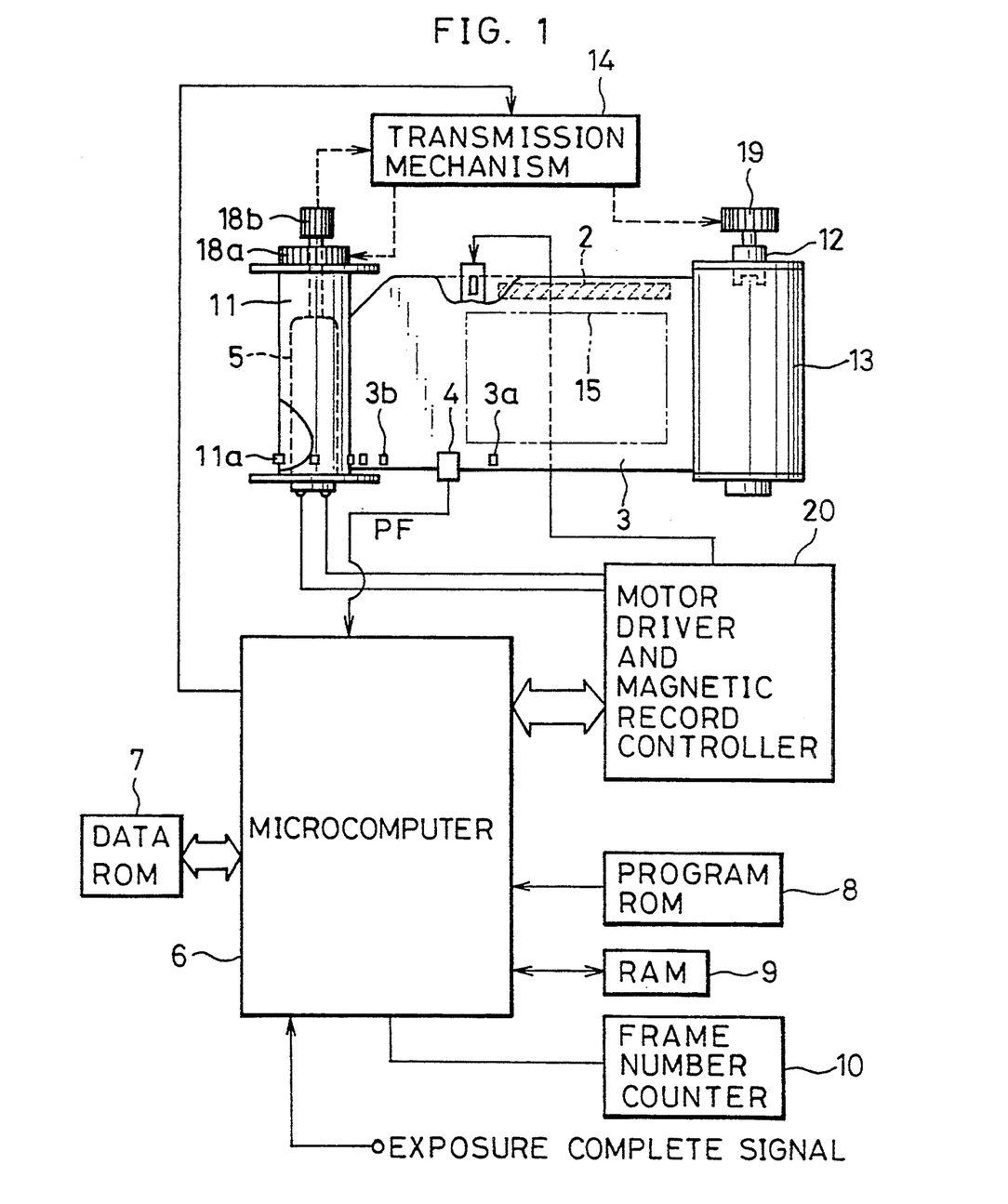
FIG. 1 is a schematic diagram showing the overall structure of a camera according to an embodiment of the present invention.

Referring to FIG. 1 showing the overall structure of a camera according to an embodiment of the invention, a motor 5 is mounted in a take-up spool 11, and driven by a motor drive and magnetic record controller 20 in response to an instruction from a microcomputer 6. After a film cassette 13 is loaded, the transmission mechanism 14 is set in a film winding position, under the control of the microcomputer 6, where the transmission mechanism 14 transmits the power of motor 5 to the take-up spool 11 through a gear train and a clutch mechanism of the transmission mechanism 14 in a conventional manner. When a one frame exposure complete signal is inputted, the motor 5 is rotated and its rotation force is transmitted to the take-up spool 11 via a gear 18a, the transmission mechanism 14, and a gear 18b. As the take-up spool 11 rotates, the exposed frame of the photographic film 3 is wound on the outer circumference of the take-up spool 11. At the same time, the unexposed frame of the film 3 is pulled out of the cassette 13. After all frames have been exposed, the rotation of the motor 5 is transmitted to a cassette spool of the cassette 13 via the gear 18b, the transmission mechanism 14, a gear 19, and a fork 12. As the cassette spool rotates, the film 3 is rewound from the take-up spool 11 into the cassette 13.

A reflection type photosensor 4 is disposed along the film passageway to detect perforations 3a of the film 3 and control one frame advance of the film 3. As the film 3 starts to be wound, the photosensor 4 radiates an infrared ray to the peripheral area of the film 3. When the photosensor 4 detects a perforation 3a, it sends a PF signal to the microcomputer 6 which in turn supplies the motor drive and magnetic record controller 20 with a stop signal to stop the motor 5 immediately. In the embodiment shown in FIG. 1, one perforation 3a is formed for each frame of the film 3. Therefore, film winding is stopped when the photosensor 4 detects a perforation 3a.

In the case of a commercially available 135 type film, eight perforations are formed for each frame. Therefore, film winding is stopped when the photosensor 4 detects eight perforations, i.e., when the eighth PF signal is inputted. Three or four perforations 3b are formed at the leader of the film 3, which are captured by claws 11a of the take-up spool 11. The photosensor 4 detects the pass of these perforations 3b during the film loading and checks whether the film has been loaded properly depending upon whether the intermittent PF signals were obtained during a predetermined time.

A magnetic head 1 is mounted, for example, on a film pressure plate (not shown) at the area outside of an exposure aperture 15. This magnetic head 1 magnetically records exposure control data such as a shutter speed and an aperture value represented by a binary code, on a transparent magnetic record layer 2 formed on the base (where an emulsion layer is not coated) of the film 3. A data ROM 7 storing exposure control data represented by binary code data is connected to the microcomputer 6.

A program ROM 8 stores sequence programs for the above-described photographing sequences and for a magnetic record control sequence to be described later, as well as other programs. A RAM 9 is used as a working area for temporarily storing data necessary for the photographing sequences and magnetic record sequence. A frame number counter 10 counts the number of exposed frames of the film 3.

Like the leader of the film 3, the trailing portion is also formed with three or four perforations at a short interval. These perforations are intermittently detected as the winding starts after the exposure of the last frame. Upon the intermittent detection of these perforations, the transmission mechanism 14 is switched to the rewinding state in response to an instruction from the microcomputer 6. Therefore, the fork 12 rotates in the rewinding direction to rewind the exposed film 3 into the cassette 13. The completion of rewinding can be detected from a signal supplied to the photosensor 4 in a known manner.

Figure 2:
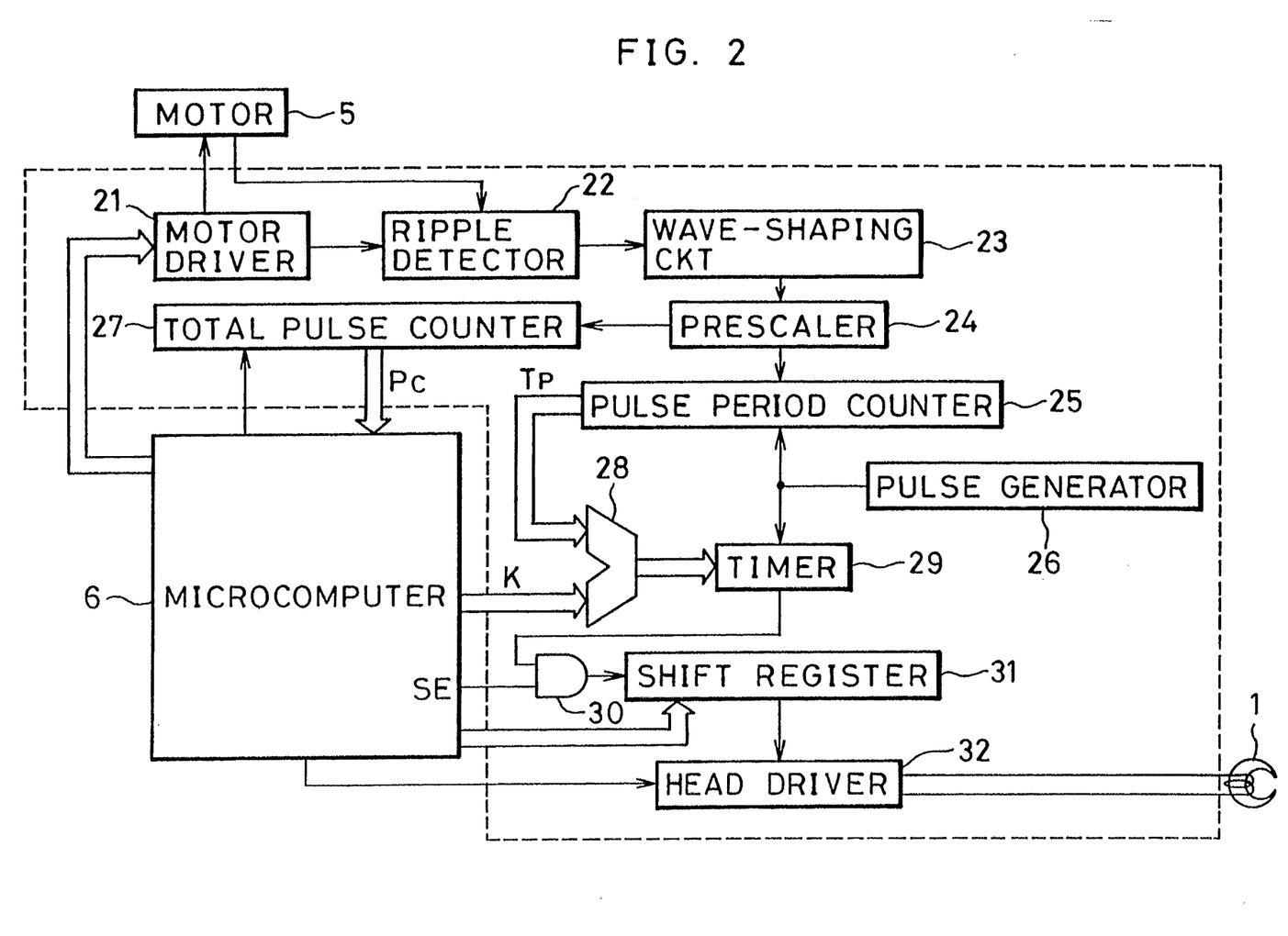
FIG. 2 is a block diagram of the data recording device shown in FIG. 1.
Figure 3:
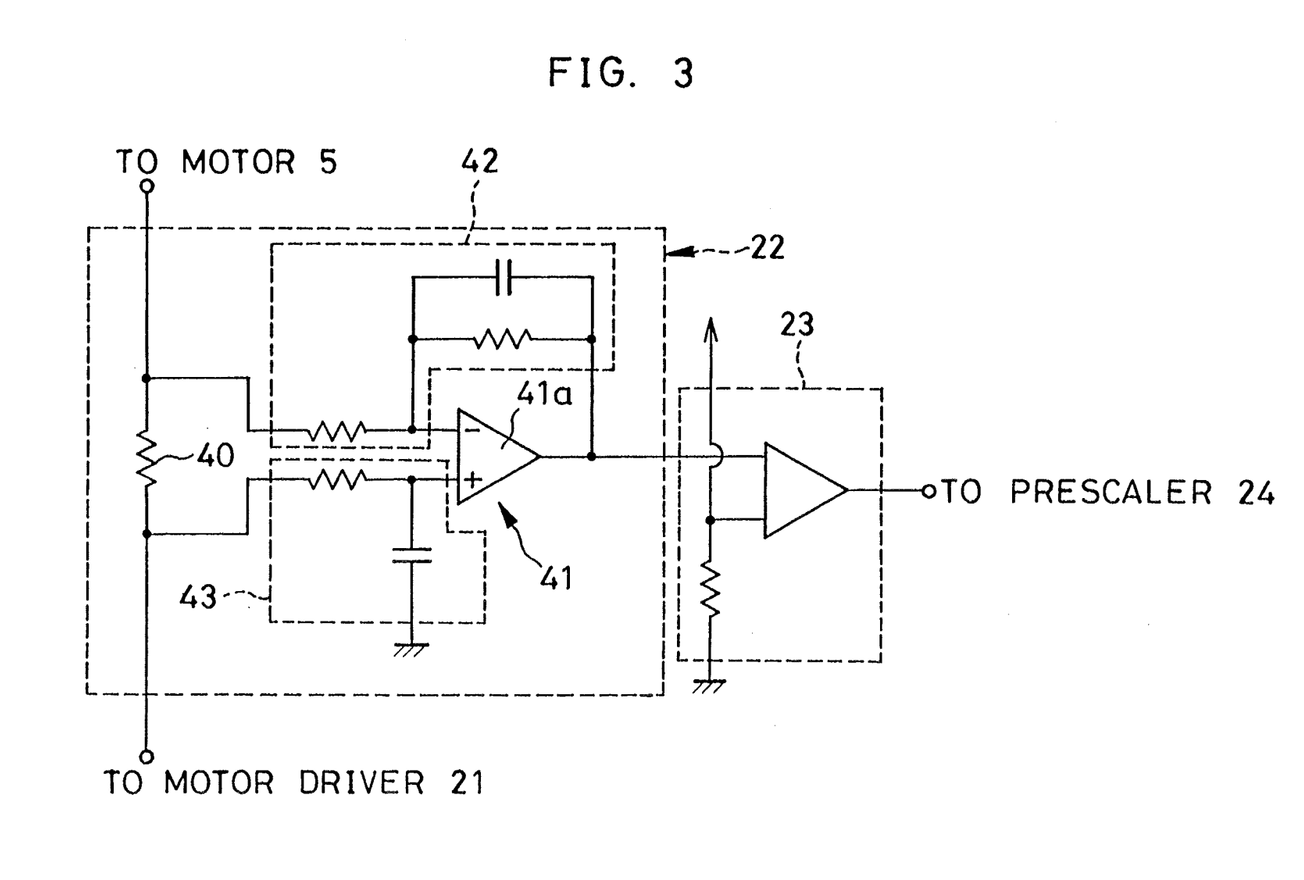
FIG. 3 is a circuit diagram of the ripple detector shown in FIG. 2.

Referring to FIG. 2 showing the motor drive and magnetic record controller 20, there are provided the motor 5, a motor driver 21, and a ripple detector 22. The current flowing through the motor 5 changes because the impedance of the motor 5 changes or fluctuates during its rotation at each predetermined rotary angle. Such a change in the motor current, i.e., a ripple component, is detected by the ripple detector 22. An example of the ripple detector 22 is shown in FIG. 3. In this circuit shown in FIG. 3, a shunt resistor 40, of about 0.5 ohm, is serially connected to the motor 5. A voltage across the shunt resistor 40 is supplied to a differential band-pass amplifier 41 having a high frequency cut circuit 42, a low frequency cut circuit 43, and an operational amplifier 41a.

Figure 4:
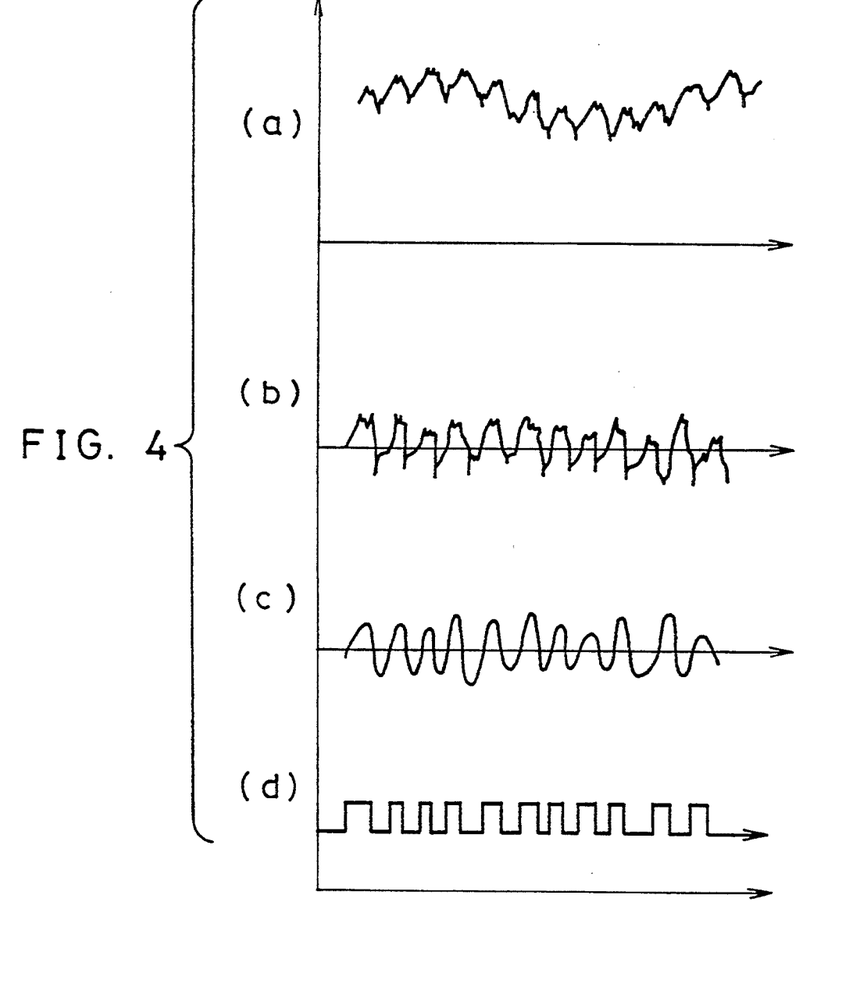
FIG. 4 shows diagrams explaining the operations of the ripple detector and wave-shaping circuit shown in FIG. 3.

As a result of experiments, it was verified that the differential band-pass amplifier 41 showed a good result by setting the band-pass frequency range to 50 Hz to 100 kHz and the gain to about 50. The current flowing through the motor 5 contains mainly three signal components, including a low frequency component, a high frequency component, and a middle frequency component or the ripple component. The shunt resistor 40 detects a current containing the three components, such as shown in FIG. 4 indicated at (a). During the film advance, the current flowing through the motor 5 changes with a motor load change caused by a friction coefficient change of the film 3 or a shutter charge. The current component of this change is removed by properly setting the lower limit of the band-pass frequency range. In this embodiment, this lower limit is set to 50 Hz by the low frequency cut circuit 43 to remove signal components at 50 Hz or lower (refer to FIG. 4 indicated at (b)). Together with ripples, chattering is generated because of a fine contact change between the brush and commutator of the motor 5. Therefore, the current flowing through the motor 5 contains the high frequency chattering component (e.g., 100 kHz or higher) which is removed by the high frequency cut circuit 42.

Only the ripple signal (refer to FIG. 4 indicated at (c)) is therefore amplified by the operational amplifier 41a.

The ripple signal detected and amplified by the ripple detector 22 is transformed into ripple pulses by a wave-shaping circuit 23 made of a comparator. The ripple pulses are supplied to a prescaler 24. The prescaler 24 generates one prescaler pulse when it receives a predetermined number of ripples pulses, for example, ten ripple pulses. The ripple signal supplied from the ripple detector 22 sometimes contains chattering and noises not removed by the differential band-pass amplifier 41. Conversely, it sometimes does not precisely indicate the ripple component. Therefore, there is a missing or redundant prescaler pulse. However, such a missing or redundant prescaler pulse is in the order of one for every ten pulses. Since the prescaler 24 generates one prescaler pulse per ten ripple pulses, an error of the period of prescaler pulses caused by one missing or redundant ripple pulse is about 10%. In this manner, a change in the one bit record length can be reduced by using the prescaler 24.

As shown in FIG. 2, the number of prescaler pulses generated during one frame advance is counted by a total pulse counter 27. The total pulse counter 27 supplies the count value Pc to the microcomputer 6 which resets the total pulse counter 27 to "0" before the counter 27 starts counting. The generation period of prescaler pulses is detected by a pulse period counter 25 which counts the number of main clock pulses generated by a pulse generator 26 after one prescaler pulse is generated until the next one prescaler pulse is generated. The count value Tp is supplied to a multiplier 28.

Each time one frame advance is completed, the microcomputer 6 calculates a coefficient K representing the relationship between the prescaler pulse period and one bit record period. This coefficient K is supplied to the multiplier 28 when the next frame is advanced. The multiplier 28 multiplies the count value Tp by the coefficient K, the result being supplied to a timer 29 as a timer value. The timer 29 counts main clock pulses of the pulse generator 26, and each time the number of counted clocks reaches the timer value, it generates a timing pulse. The timing pulse is applied to one input of a two-input AND gate 30 whose other input is coupled to a shift enable terminal of the microcomputer 6. A pulse outputted by the AND gate 30 when the timing pulse is supplied while the shift enable terminal takes a high "H" level, is inputted to a shift register 31 as its shift pulse. The shift register 31 is already loaded with bits of digital data in the order of recording them, and shifts one bit after another in response to the shift pulse to send the bit at the last stage of the shift register 31 to a head driver 32. The head driver 32 drives the magnetic head 1 by using the one bit data supplied from the shift register 31 to record a magnetic signal on the magnetic recording layer 2 of the film 3.

Figure 5:
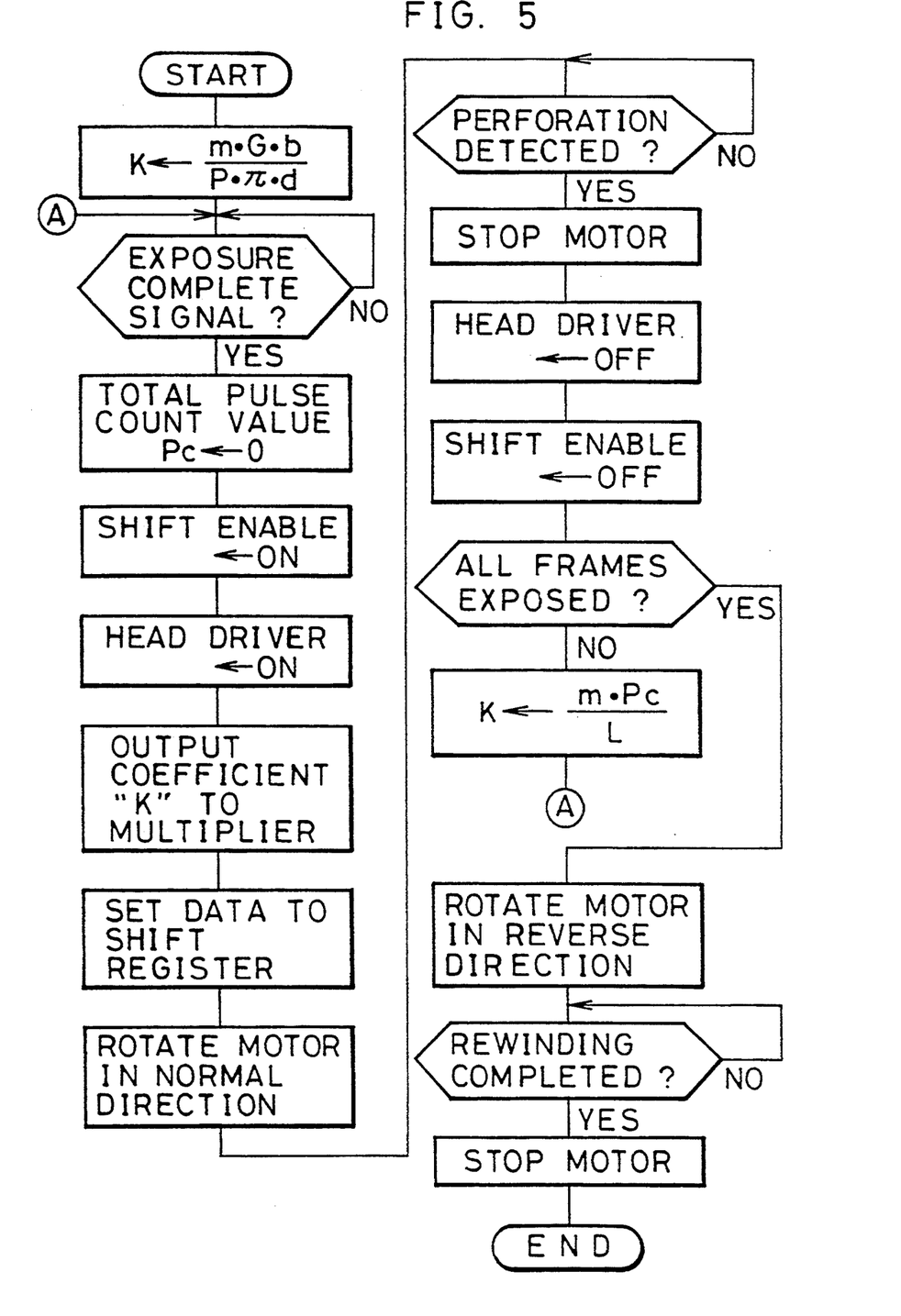
FIG. 5 is a flow chart explaining the operation of the microcomputer.
Figure 6:
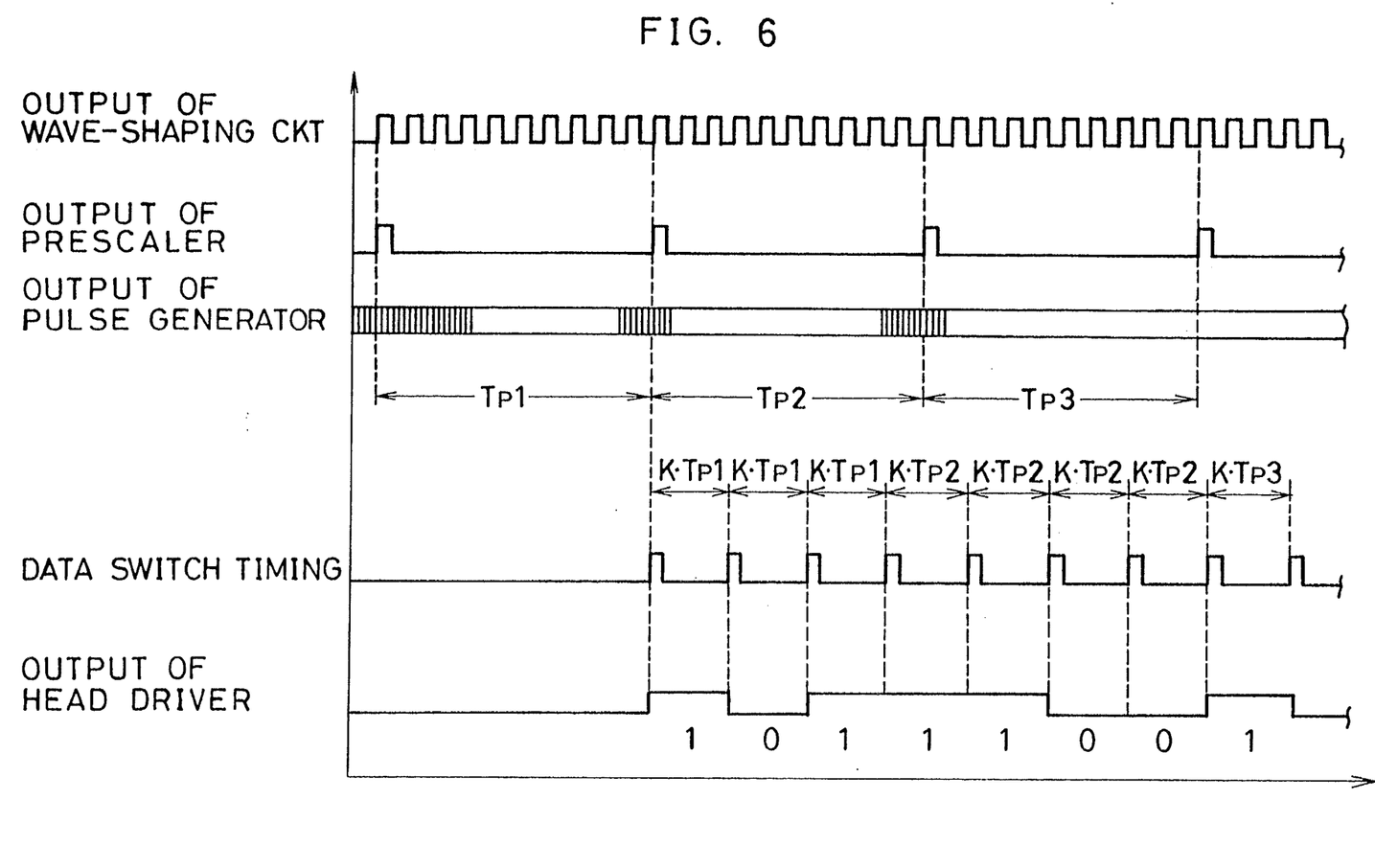
FIG. 6 is a timing chart explaining the data record operation.

Next, the operation of the embodiment will be described with reference to FIGS. 5 and 6. Upon depression of a shutter button, the shutter is driven in a known manner to expose a frame of the film 3 at the back of the exposure aperture 15 and form a picture frame. When the shutter is closed, an exposure complete signal is generated and supplied to the microcomputer 6 which in turn resets the count value Pc of the total pulse counter 27 to "0". At this time, the shift enable terminal SE takes an "H" level and the head driver is turned on. The microcomputer 6 sets the digital data concerning the exposed frame to the shift register 31, and sets the coefficient K to the multiplier 28. As described previously, the coefficient K represents the relationship between the ripple period and the one bit record length. The coefficient K is updated at each one frame advance and calculated from the following equation (1) when the first frame is wound.

$$K = m \times G \times b / (p \times \pi \times d) \tag{1}$$

In the equation (1), "m" represents the length of one bit to be recorded on the magnetic recording layer 2. "G" represents a reduction ratio (gear ratio) of the gear train between the motor 5 and take-up spool 11. "b" represents the number of ripple pulses generated during one rotation of the motor 5. "p" represents an integration factor of the prescaler 24 which is the number of ripple pulses necessary for outputting one prescaler pulse. "d" represents the diameter of a roll of the film around which the first frame is to be wound. The value "d" is generally equal to the diameter of the take-up spool 11 for the system other than the pre-wind system wherein the roll of unexposed film is first wound on the take-up spool and thereafter it is rewound into a film cassette each time a frame is exposed. "π" represents the standard circle ratio value.

After setting the coefficient "K" to the multiplier 28, the microcomputer 6 instructs to drive the motor 5 to rotate. As the motor 5 starts rotating, the take-up spool 11 rotates so that the exposed first frame is wound on the outer circumference of the spool 11. During this film winding, the ripple signal detected by the ripple detector 2 is wave-shaped by the wave-shaping circuit 23 to be transformed into ripple pulses which are supplied to the prescaler 24. The prescaler 24 generates one prescaler pulse when it has counted ten ripple pulses. The period of prescaler pulses is counted by the pulse period counter 25 and its count value is inputted to the multiplier 28.

The multiplier 28 multiplies the prescaler pulse period "Tp" by the coefficient "K", the multiplied result being set to the timer 29. The timer 29 divides main clocks of the pulse generator 29 by a value "Tw" to generate pulses having the period "Tw" which are supplied to the AND gate 30. Since the AND gate 30 has already been set to an active state by the shift enable signal, each time a pulse is supplied from the timer 29 the AND gate 30 generates a shift pulse and supplies it to the shift register 31. The shift register 31 sends digital data one bit after another to the head driver 32 at the input timing of each shift pulse. The head driver 32 drives the magnetic head 1 to magnetically record photographing data on a partial area of the magnetic recording layer 2 formed at the peripheral area of the first frame. Since the magnetic head 1 is driven synchronously with the timing of a generated shift pulse, a one bit record length can be maintained constant.

During one frame advance, detecting and wave-shaping the ripple signal and outputting prescaler pulses from the prescaler 24 are continuously performed. Also, counting the prescaler pulse period is continuously performed by the pulse period counter 25. The prescaler pulse period "Tp" is sent to the multiplier 28 each time a new prescaler pulse is supplied from the prescaler 24 to set a new value "Tw" via the multiplier 28 to the timer 29. By using the updated values of "Tw" as the one bit record period, digital data is recorded one bit after another on the magnetic recording layer 2. In FIG. 6, the first prescaler pulse period is represented by Tp1, and the second and following periods are represented by TP2 and Tp3 and so on. When the photosensor 4 detects the next perforation, the motor 5 is stopped to complete the film winding. At the same time, the head driver 32 is turned off and the shift enable terminal SE is set to a low "L" level.

Next, the method of deriving the equation (1) will be described. Representing the transportation speed of the film 3 by "v", the rotation period "Ts" of the take-up spool 11 is given by the following equation (2).

$$Ts = \pi \times d/v \tag{2}$$

The rotation period "Tm" of the motor 3 is therefore given by dividing the rotation period "Ts" of the take-up spool 11 by the gear train reduction ratio "G".

$$Tm \times \pi \times d/(v \times G) \tag{3}$$

The generation period "Tr" of ripple pulses is given by equation (4) by using the number "r" of ripple pulses generated during one rotation of the motor 3. From the equation (4) and using the integration factor "p", the period of prescaler pulses generated by the prescaler 24 is given by equation (5).

$$Tr = \pi \times d/(v \times G \times b) \tag{4}$$

$$Tp \times p \times \pi \times d/(v \times G \times b) \tag{5}$$

The read period of the shift register 31 for recording one bit of a length "m" on the film 3 transported at the speed "v", i.e., the output value "Tw" of the multiplier 28, is given by equation (6).

$$Tw = m/v \tag{6}$$

Since the prescaler pulse period "Tp" multiplied by the coefficient "K" is one bit record period "Tw", equation (7) is obtained. By rearranging equation (7), equation (1) can be obtained.

$$K \times P \times \pi \times d/(v \times G \times b) = m/v \tag{7}$$

The count "Pc" of the total pulse counter 27 when one frame advance is completed is equal to the number of prescaler pulses generated during the one frame advance. The length "L" of one frame is already known. Therefore, the coefficient "K" which makes the length of each bit recorded on the first frame constant, can be determined. Since digital data for the first frame has already been recorded, this coefficient "K" is used for the second frame. The optimum coefficient "K" for each frame changes with the roll diameter "d". The roll diameter "d" for adjacent frames are generally the same, and so the coefficients "K" for adjacent frames are also generally the same. Since the coefficient "K" is updated at each one frame advance, bits of substantially the same length can be recorded on the magnetic recording layer 2 while compensating for a change in the roll diameter "d".

The coefficient "K" updated after each one frame advance can be calculated from the following equation (8).

$$K = m \times Pc/L \tag{8}$$

where "m" represents the length of one bit data which is a known value. "Pc" represents the count of the total pulse counter 27, and "L" represents the length of one frame. Equation (8) is obtained in the following manner. The coefficient "K" after one frame advance having a roll diameter "d1" is given by equation (9) like the equation (1).

$$K = m \times G \times b/(p \times \pi \times d1) \tag{9}$$

The number "Rs" of rotations of the take-up spool 11 required for the film 3 having the roll diameter "d1" to be advanced by another one frame distance, is given by equation (10).

$$Rs = L/(\pi \times d1) \tag{10}$$

Therefore, the number "Rm" of the motor 5 is given by equation (11).

$$Rm = G \times L/(\pi \times d1) \tag{11}$$

From equation (11) and the number "b" of ripple pulses generated during one rotation of the motor 5, the number "Pr" of ripple pulses generated during one frame advance of the film 3 is given by equation (12). The total number "Pc" of prescaler pulses is given by equation (13).

$$Pr = b \times G \times L/(\pi \times d1) \tag{12}$$

$$Pc = b \times G \times L/(\pi \times d1 \times p) \tag{13}$$

From equations (9) and (13), equation (8) can be obtained. The new coefficient "K" calculated from equation (8) is written in RAM 9 to update the coefficient "K". After the next frame is exposed upon depression of the shutter button, the film winding as described above is again performed. During the film winding, data is recorded using the updated coefficient "K". After the film winding is completed, the coefficient "K" is again updated. These operations are repeated to record digital data represented by bits having a predetermined record length, on the magnetic recording layer 2 of the film 3.

Figure 7:
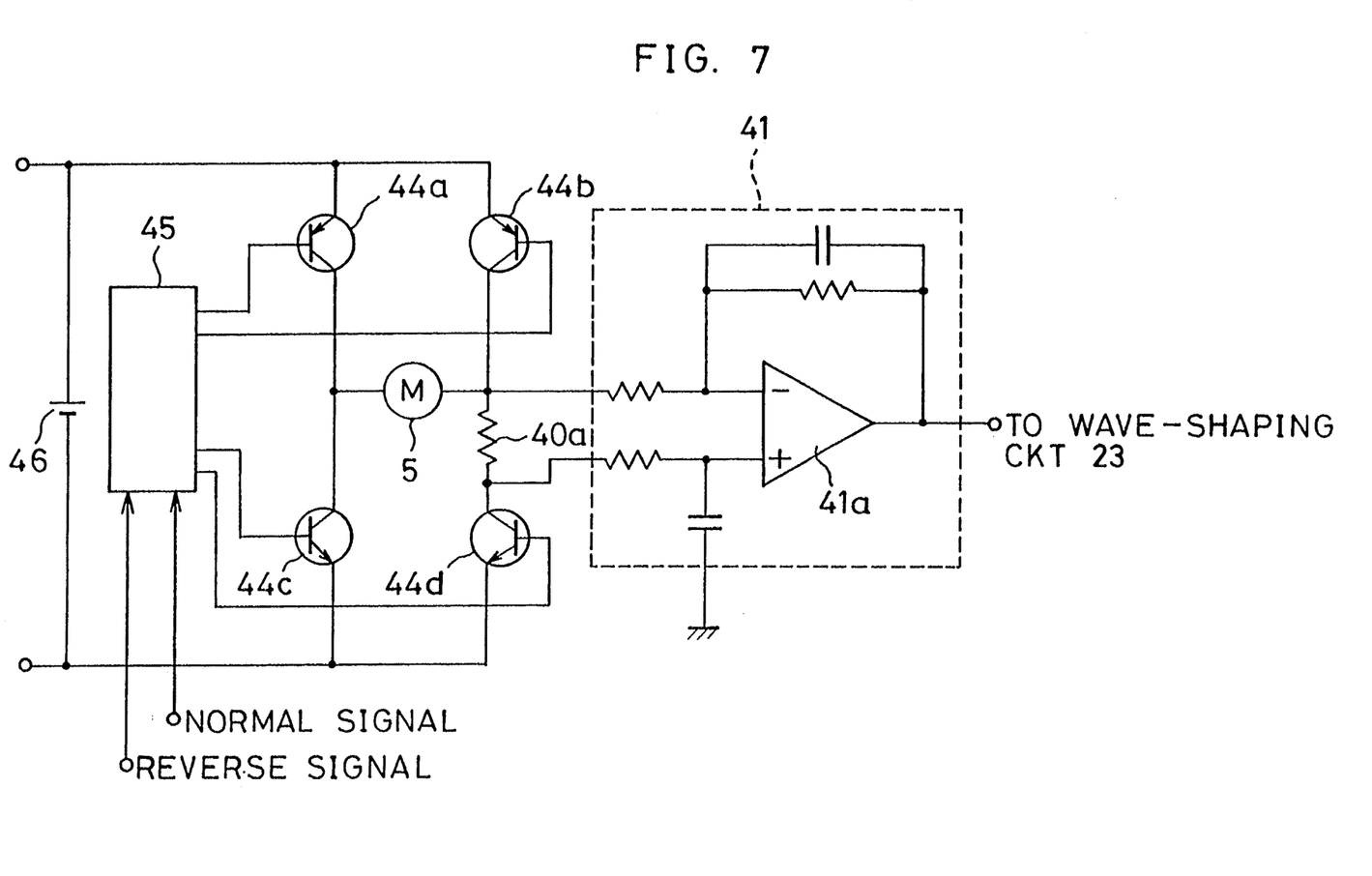
FIG. 7 is a circuit diagram showing another example of the ripple detector.

FIG. 7 is a circuit diagram showing a ripple detector and a motor driver according to another embodiment. The motor driver is constructed of four transistors 44a to 44d in a bridge configuration and a transistor control block 45. These components are driven by a power source (e.g., a battery) 46. A shunt resistor 40a is connected in series with the transistor 44d. A voltage across the shunt resistor 40a is inputted to a differential band-pass amplifier 41. An output of the band-pass amplifier 41 is supplied to the wave-shaping circuit 23 shown in FIG. 3, for the control of one bit record time in a manner similar to the above-described embodiment.

Upon reception of a normal rotation signal from the microcomputer 6, the transistor control block 45 turns on the transistors 44a and 44d to rotate the motor 5 in the film winding direction. Upon reception of a reverse rotation signal from the microcomputer 6, the transistor control block 45 turns on the transistors 44b and 44c to rotate the motor 5 in the film rewinding direction.

While the motor 5 rotates, a voltage across the shunt resistor 40a is inputted to the differential band-pass filter 41 and ripples of the motor drive current are detected in the manner described above. In this embodiment, ripples are detected only while the motor 5 rotates in the film winding direction. This poses no problem because data is recorded while the film is wound. Also by this combination of ripple detector data motor driver, data having a constant bit length can be recorded on the magnetic recording layer 2 of the film 3.

Figure 8:
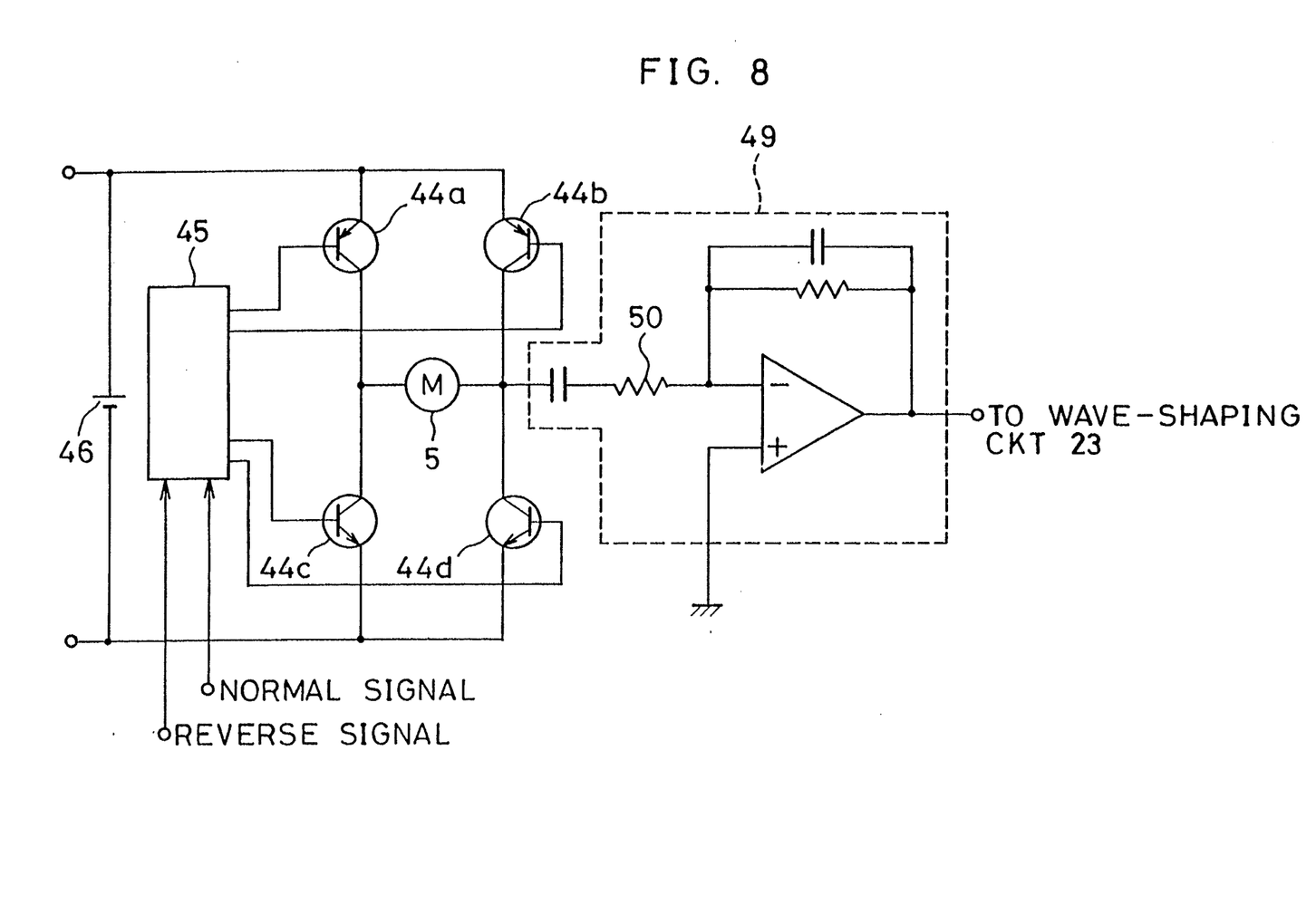
FIG. 8 is a circuit diagram showing another example of the ripple detector.

FIG. 8 shows a further embodiment. In this embodiment, a band-pass amplifier 49 is connected to the interconnection node between the collector of a transistor 44b, the emitter of a transistor 44d, and one terminal of a motor 5. The band-pass amplifier 49 amplifies the signal within the frequency range similar to the first embodiment. Generally, in the saturated operation of a transistor, a change in the collector—emitter voltage Vce is generally proportional to a change in the collector—emitter current Ice, and so the transistor operates as having a resistor Rc between the emitter and collector. A transistor of the type used for driving the motor 5 has the resistor Rc of 0.1 to 0.2 ohm. Ripples can be detected from a change in Vce of the transistor 44d. The resistance value of a resistor 50 is smaller than the shunt resistor 40 of the embodiment shown in FIG. 3 so that the gain of the band-pass amplifier 49 becomes high. An output of the band-pass amplifier 49 is supplied to the wave-shaping circuit 23 shown in FIG. 3.

In the above embodiments, a ripple signal is detected from a change in the current flowing through the motor 5, the change corresponding to a change in the rotary angle of the motor 5. Based on this rotary angle, a one bit record period or time is determined. Instead of such a method, the rotary angle of a motor may be detected by photoelectrically monitoring a vane mounted on the rotary shaft of the motor, as shown in FIGS. 9 to 11.

Figure 9:
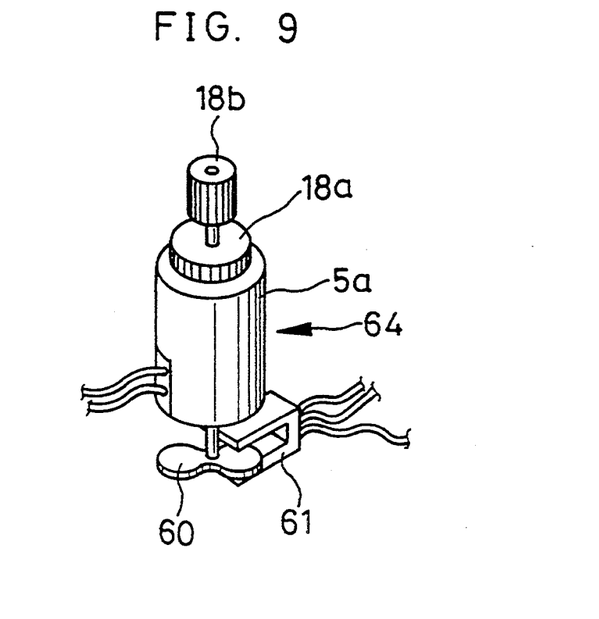
FIG. 9 is a perspective view showing the main part of an embodiment wherein the rotation of a motor is detected from the rotation of a vane.
Figure 10:
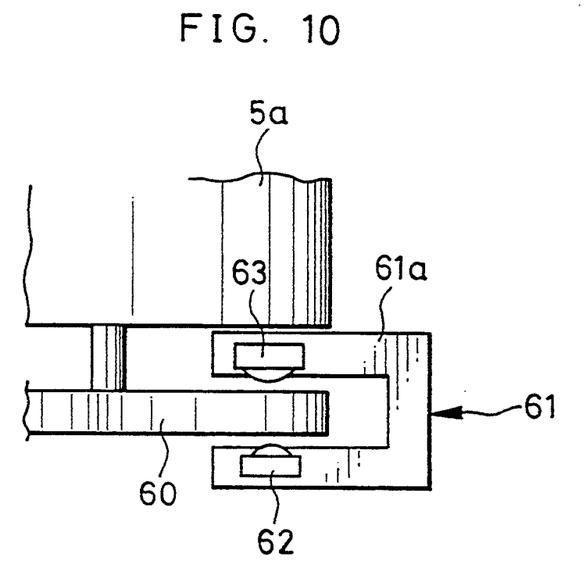
FIG. 10 is an explanatory view showing the structure of the photosensor shown in FIG. 9.
Figure 11:
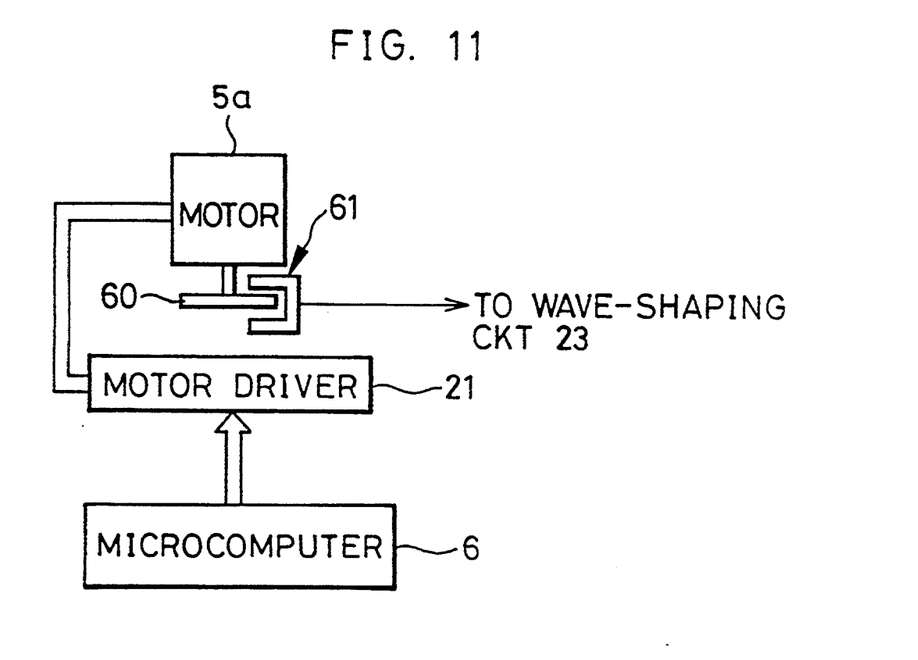
FIG. 11 is a schematic diagram illustrating the operation of the device shown in FIG. 9.
Figure 12:
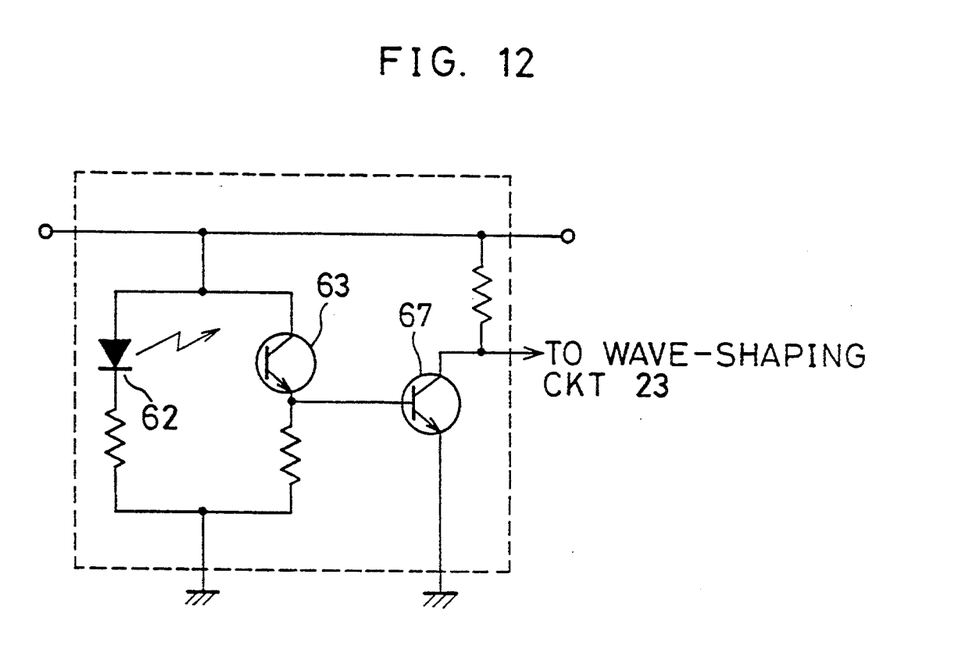
FIG. 12 is a circuit diagram of the photosensor shown in FIG. 9.

Referring to FIGS. 9 and 10, a two-blade vane 60 is fixed to the rotary shaft of a motor 5a. A photosensor 61 having a channel shape frame 61a is fixed to the motor 5a, the vane 60 being interposed in a space inside the channel shape frame 61a of the photosensor 61. As shown in FIG. 10, a light emitting diode 62 and a phototransistor 63 of the photosensor 61 are embedded in the walls of the channel shape frame 61a. As shown in FIG. 11, as the motor 5a is rotated by a motor driver 21, the film is wound as described previously. As the motor 5a rotates, the vane 60 also rotates to close and open the optical path between the light emitting diode 62 and phototransistor 63. When the vane closes the optical path, no current will flow between the emitter and collector of the phototransistor 63. When the vane opens the optical path, current will flow between the emitter and collector of the phototransistor 63. Therefore, the transistor 67 is switched as the vane rotates, and generates pulses. These pulses are inputted to the wave-shaping circuit 23 shown in FIG. 3.

In this embodiment, two pulses are generated during one rotation of the motor 5a. The coefficient "K" can be calculated therefore by setting the number "b" of ripple pulses to "2" in the calculation of the above embodiment. In this embodiment, there is no chance of missing or redundant pulses as in the above embodiment, so that a more reliable data record can be ensured. The vane 60 is not limited to a two-blade vane, but a three-blade vane, a four-blade vane, and the like may also be used with the value "b" being set to the number of blades. The prescaler 24 may be omitted. In this case, the integration factor "p" is set to "1" and a pulse outputted from the wave-shaping circuit 23 is directly inputted to the pulse period counter.

Figure 13:
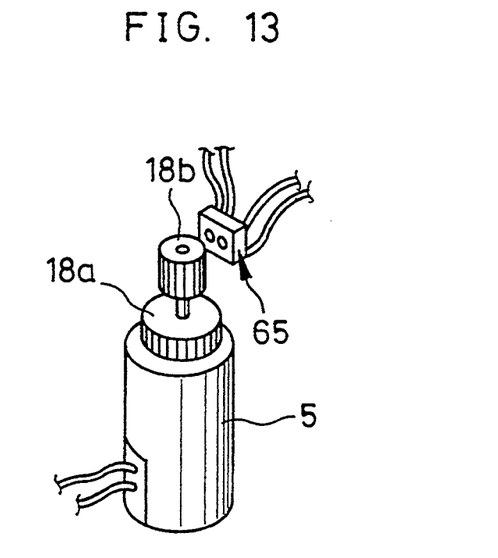
FIG. 13 is a perspective view illustrating an embodiment wherein the rotation of a motor is detected from the teeth of a gear.
Figure 14A:
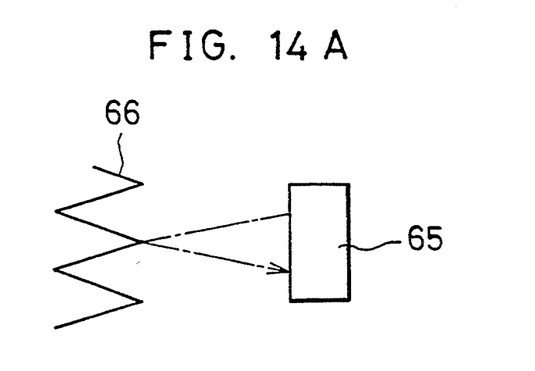
FIGS. 14A and 14B are explanatory views showing the detection operation of a photosensor.
Figure 14B:
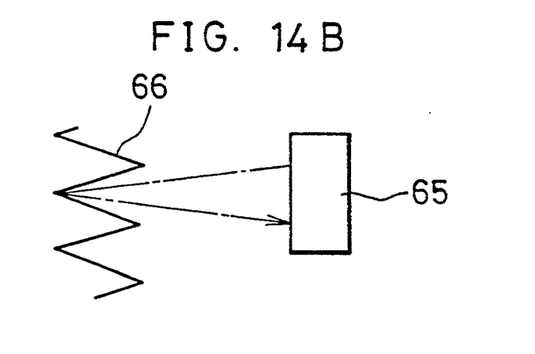

FIGS. 13 and 14 show another embodiment wherein the teeth of a gear are detected. A reflection type photosensor 65 is disposed near a motor 5 for the detection of each tooth of the gear. The level of an output of the reflection type photosensor 65 changes with the distance to an object. As shown in FIG. 14A, when the peak of each tooth 66 faces the photosensor 65, a large output is obtained, and as shown in FIG. 14B, when the valley of each tooth 66 faces the photosensor 65, a small output is obtained. In this manner, pulses corresponding to the number of teeth of the gear 66 can be obtained during one rotation of the motor 5.

In the above embodiments, magnetic data recording has been described. The present invention is also applicable to optical data recording, In this case, a light emitting diode is placed near a film, and the emitted light is applied via a slit to the film to record a bar code on the film.

Although the present invention has been described with reference to the preferred embodiments shown in the drawings, the invention should not be limited by the embodiments but, on the contrary, various modifications, changes, combinations and the like of the present invention can be effected without departing from the spirit and scope of the appended claims.

I claim:

1. A method of recording digital data on a photographic film loaded in a camera, said camera having a data recording device and a motor for transporting said film, said data recording device recording bits constituting said digital data on said film while said film is advanced by a distance corresponding to one frame by said motor, said method comprising the steps of:
   generating a pulse in response to each incremental amount of rotation of a shaft of said motor;
   measuring the pulse period between each pulse generated while said shaft of said motor rotates;
   generating a timing signal for determining the record period of each of said bits based on said pulse period as modified by a coefficient determined for each frame, said coefficient being determined from an estimated record length of each of said bits, the total number of said pulses generated during a previous one frame advance of the said film, and the length of one frame; and
   driving said data recording device on the basis of said timing signal.

2. A data recording method according to claim 1, wherein said pulse period measuring steps includes a step of detecting a ripple signal contained in a current flowing through said motor, generating said pulse each time when a predetermined number of ripple signals is detected, and measuring the period of said pulses.

3. A data recording method according to claim 1, wherein said pulse period measuring step includes a step of providing a rotary member rotating with said motor and a photosensor for generating a signal each time said rotary member rotates by a predetermined rotary angle, generating said pulse each time when a predetermined number of signals from said photosensor is detected, and measuring the period of said pulses.

4. A camera having a data recording device and a motor for transporting a photographic film, said data recording device recording bits constituting digital data on said film while said film is advanced by a distance corresponding to one frame by said motor, said camera comprising:
   means for detecting, from a change in a current flowing through said motor, that said motor has rotated by a predetermined rotary angle; and
   means for generating a timing signal in accordance with a signal supplied from said detecting means, said timing signal controlling the operation of said data recording device to determine a record period of each of said bits to be recorded on said film.

5. A camera according to claim 4, wherein said data recording device includes a shift register for being set with said digital data and for sequentially reading each of said bits of said digital signal in response to said timing signal.

6. A camera according to claim 5, wherein said data recording device includes a magnetic record circuit for converting data of each of said bits read from said shift register into a magnetic signal, and a magnetic head for recording said magnetic signal on a magnetic recording layer formed in said film.

7. A camera according to claim 4, wherein said detecting means includes a ripple pulse generator for detecting a ripple signal contained in a current flowing through said motor and generating a ripple pulse, a prescaler for generating one prescaler pulse each time when a number "P" of said ripple pulses are counted, and a first counter for measuring the period of said prescaler pulses.

8. A camera according to claim 7, wherein said timing signal generating means includes calculating means for calculating a one bit record period by using said prescaler pulse period, and a timer for generating said timing signal each time said one bit record period has elapsed.

9. A camera according to claim 8, wherein said calculating means calculates $T = K \times Tp$ each time said prescaler pulse period is measured, where "Tp" represents said prescaler pulse period, "K" represents a coefficient, and "T" represents said one bit record period.

10. A camera according to claim 9, wherein said coefficient "K" is within a range of $0 < K < 1$, and is calculated by said calculating means immediately after the completion of winding a preceding frame, in accordance with the winding state of said preceding frame.

11. A camera according to claim 10, further comprising a take-up spool for winding said film, and a gear train for transmitting the rotation force of said motor to said take-up spool.

12. A camera according to claim 11, wherein said coefficient "K" is obtained from the equation:

$$K = m \times Pc/L,$$

where "m" represents a estimated one bit record length, "Pc" represents the number of prescaler pulses generated during one frame winding, and "L" represents the length of one frame.

13. A camera according to claim 12, wherein said coefficient "K" for the first frame of said film is obtained from the equation:

$$K = m \times G \times b/(P \times \pi \times d),$$

where "G" represents the reduction ratio of said gear train, "b" represents the number of ripple pulses generated during one rotation of said motor, and "d" represents the roll diameter of said film wound on said take-up spool at the time when the first frame starts being wound.

14. A camera according to claim 13, wherein said ripple pulse generator includes a shunt resistor serially connected to said motor, a first filter circuit connected to a first end of said shunt resistor for eliminating a low frequency component of a first signal picked up from said first end, a second filter circuit connected to a second end of said shunt resistor for eliminating a high frequency component of a second signal picked up from said second end, an operational amplifier for amplifying a difference between the output signals from said first and second filter circuits and outputting said ripple signal, and a wave-shaping circuit for wave-shaping said ripple signal and generating said ripple pulse.

15. A camera according to claim 13, wherein said ripple pulse generator includes a first filter circuit serially connected to said motor for picking up a fraction of a current flowing through said motor and eliminating a low frequency component of said current, an operational amplifier for amplifying an output signal from said first filter circuit, and a second filter circuit provided as a feedback circuit of said operational amplifier for eliminating a high frequency component of an output from said first filter circuit.

16. A camera having a data recording device and a motor for transporting a photographic film, said data recording device recording each bit constituting digital data on said film while said film is advanced by a distance corresponding to one frame by said motor, said camera comprising:

a rotary member coupled to a rotary shaft of said motor;

optical detecting means for detecting the rotation of said rotary member and generating a pulse in response thereto;

a prescaler for generating one prescaler pulse each time "P" pulses are counted;

a first counter for measuring the period of said prescaler pulses; and means for generating a timing signal in response to said prescaler pulse period, said timing signal controlling the operation of said data recording device to determine a record period of each said bit to be recorded on said film.

17. A camera according to claim 16, wherein said data recording device includes a shift register for being set with said digital data and for sequentially reading each of said bits of said digital signal in response to said timing signal.

18. A camera according to claim 17, wherein said data recording device includes a magnetic record circuit for converting data of each of said bits read from said shift register into a magnetic signal, and a magnetic head for recording said magnetic signal on a magnetic recording layer formed in said film.

19. A camera according to claim 16, wherein said timing signal generating means includes calculating means for calculating a one bit record period by using said prescaler pulse period, and a timer for generating said timing signal each time said one bit record period has elapsed.

20. A camera according to claim 19, wherein said calculating means calculates $T = K \times Tp$ each time said prescaler pulse period is measured, where "Tp" represents said prescaler pulse period, "K" represents a coefficient, and "T" represents said one bit record period.

21. A camera according to claim 20, wherein said coefficient "K" is within a range of $0 < K < 1$, and is calculated by said calculating means immediately after the completion of winding a preceding frame in accordance with the winding state of said preceding frame.

22. A camera according to claim 21, further comprising a take-up spool for winding said film, and a gear train for transmitting the rotation force of said motor to said take-up spool.

23. A camera according to claim 22, wherein said coefficient "K" is obtained from the equation:

$$K = m \times Pc/L,$$

where "m" represents an estimated one bit record length, "Pc" represents the number of prescaler pulses generated during one frame winding, and "L" represents the length of one frame.

24. A camera according to claim 23, wherein said coefficient "K" for the first frame of said film is obtained from the equation:

$$K = m \times G \times b/(P \times \pi \times d),$$

where "G" represents the reduction ratio of said gear train, and "d" represents the roll diameter of said film wound on said take-up spool at the time when the first frame starts being wound.

25. A camera according to claim 24, wherein said rotary member is a vane, and said optical detecting means generates said pulse each time said vane passes by said optical detecting means.

26. A camera according to claim 25, wherein said vane is fixed to said rotary shaft of said motor.

27. A camera according to claim 24, wherein said rotary member is one gear of said gear train, and said optical detecting means generates said pulse each time a tooth of said gear passes by said optical detecting means.

28. A camera according to claim 27, wherein said one gear is fixed to said rotary shaft of said motor.

* * * * *